United States Patent [19]

Thomas

[11] Patent Number: 4,894,644
[45] Date of Patent: Jan. 16, 1990

[54] TOOL BREAK/WEAR DETECTION USING A TRACKING MINIMUM OF DETECTED VIBRATIONAL SIGNAL

[75] Inventor: Charles E. Thomas, Scotia, N.Y.

[73] Assignee: General Electric Company, Schenectady, N.Y.

[21] Appl. No.: 253,026

[22] Filed: Oct. 4, 1988

[51] Int. Cl.[4] .............................................. G08B 21/00
[52] U.S. Cl. ..................... 340/680; 73/104; 73/660; 340/683
[58] Field of Search .................. 340/680, 683; 73/104, 73/660; 364/508, 474.17

[56] References Cited

U.S. PATENT DOCUMENTS

| | | | |
|---|---|---|---|
| 4,636,780 | 1/1987 | Thomas et al. ..................... | 340/680 |
| 4,642,617 | 2/1987 | Thomas et al. ..................... | 340/680 |
| 4,707,688 | 11/1987 | Thomas ................................ | 340/680 |
| 4,724,524 | 2/1988 | Thomas et al. .................. | 364/474.17 |
| 4,764,760 | 8/1988 | Bedard et al. ........................ | 340/680 |

Primary Examiner—Joseph A. Orsino
Assistant Examiner—Thomas J. Mullen, Jr.
Attorney, Agent, or Firm—James S. Beulick; James C. Davis, Jr.; Paul R. Webb, II

[57] ABSTRACT

Gradual wear or breakage of a machine tool which occurs over a period of time is detected by sensing high frequency vibrations produced at the cutting tool/workpiece interface during a machining process. The high frequency vibrations are converted to a unipolar vibration signal which is processed to produce a tracking signal which tracks the minimum value of the vibration signal. The vibration signal is related to the effective cutting energy and it decreases due to gradual tool wear or breakage. The tracking minimum signal is compared to a predetermined threshold level to detect excessive wear or breakage of the tool, and an alarm is provided.

19 Claims, 4 Drawing Sheets

TOOL BREAK/WEAR DETECTION USING A TRACKING MINIMUM OF DETECTED VIBRATIONAL SIGNAL

BACKGROUND OF THE INVENTION

This invention relates generally to systems and methods for monitoring a machine tool to detect tool breakage and/or wear which produce changes in machining conditions that occur over a period of time.

Various machine tool monitoring systems and methods for sensing tool breakage or wear in lathes, milling machines and other machine tools based upon recognition of characteristic signatures in cutting noise vibrational signals have been developed and are well known. Generally, these systems and methods sense a broad band of energy produced during a machining or cutting process, detect the energy produced in a particular narrower high frequency band, and produce a corresponding analog electrical signal. This analog signal may be processed to provide a unipolar signal which has a level that is closely related to the cutting energy and to the efficiency of the cutting process. The unipolar signal may be analyzed in real-time for characteristics or clues that indicate tool breakage, excessive tool wear, or other events of interest in controlling the machining process. One clue which is often detected and which is sometimes used in conjunction with other clues from vibration or other sensed signals is a gradual decrease in the energy in the detected high frequency band of the unipolar vibration signal which accompanies a decrease in the efficiency of the cutting process. Events which have been found to produce relatively gradual decrease in the efficiency with which a tool cuts metal include the very rapid wear or "crumbly breakage" of ceramic lathe tools which takes place over a period of one to a few seconds of cutting time, the normal gradual wear of a turning and milling tool which takes place over a period of minutes of cutting time, or chip burning and tool clogging of milling tools which takes place over a period of time of the order of ten seconds or so. Events such as these all require changes in the machining operation, and all tend to be characterized by an increase in the total energy supplied by the machine tool and a decrease in the effective cutting energy, i.e., a decrease in cutting efficiency.

Data indicates that vibration energy at frequencies above about 30 KHz decreases as cutting efficiency decreases, whereas vibration energy at frequencies in the audio range tends to increase. The exact crossover frequency has not been determined. This decrease in high frequency energy may be detected and used for indicating the need for changes in a machining operation by creating and monitoring the level of a tracking mean value signal which tracks the mean value of the signal samples of the unipolar signal. A decrease in cutting energy may be detected by monitoring the tracking mean value signal and detecting the level of the signal decreasing to one or more predetermined threshold levels.

Mean signal level decreases, however, may result from other than tool breakage or wear. They may be caused, for example, by certain conditions that may be encountered as the tool path is followed during normal machining conditions, as where the tool load changes without a change in cutting efficiency. Furthermore, as the cutting tool wears and the tool cutting edge deforms, new sources of vibration may come into play due to abnormal cutting additions. These may be manifested as spiky noise which is superimposed upon the vibration signal. As the cutting changes, for example, from a chisel-type operation to more of a scraping-type action as the cutting tool dulls and the geometry of its cutting edge changes, there is often a marked increase in dense high amplitude noise spikes in the high frequency vibration signal. These noise spikes cannot be separated from the main cutting noise components of the vibrational signal. They tend to increase the mean signal level and obscure the decrease in the mean which would otherwise occur if the spikes were not present. As abnormal cutting conditions increase and cutting becomes more inefficient, the energy in the noise spikes, which represents mostly wasted energy, increases while the energy between the spikes, which represents effective cutting energy, decreases. Including the spike energy in the mean signal level measurement accordingly reduces the sensitivity of the cutting tool break/wear detector.

It is desirable to improve the sensitivity of cutting efficiency monitors and to provide a method and system which overcome the foregoing and other disadvantages of known methods and systems for detecting tool break and wear. It is to this end that the present invention is directed.

SUMMARY OF THE INVENTION

The invention provides an improved system and method for detecting gradual wear and breakage of a machine tool which affords improved sensitivity and has other advantages over known systems and methods. The improved sensitivity derives from the use of a tracking signal which tracks the minimum values of a high frequency vibration signal produced by sensing vibrations above about 30 KHz at a cutting tool/workpiece interface for monitoring cutting energy. Gradual deterioration or breakage of the tool is accompanied by a decrease in cutting energy, which manifests itself as a decrease in the high frequency vibration signal. However, as the geometry of the cutting edge of the tool changes with wear and/or breakage, the abnormal cutting conditions cause an increase in noise spikes on the high frequency vibration signal. These noise spikes tend to obscure the mean level of the high frequency vibration signal, but have substantially less effect on the minimum value of the signal. As a result, the minimum value of the high frequency vibration signal decreases consistently and at a higher rate than the mean of the signal, which affords a greater sensitivity to changes in tool condition. By monitoring the level of the tracking minimum signal relative to one or more threshold levels, a predetermined amount of wear or breakage may be readily detected and an appropriate alarm given.

Briefly stated, in one aspect, the invention affords a method of detecting machine tool wear which comprises sensing vibration energy produced during the machining of a workpiece with the tool, and generating an electrical vibration signal corresponding to the sensed vibration energy. The vibration signal is processed to produce a tracking signal which tracks the minimum values of the vibration signal as opposed to the mean values. The tracking signal is compared to a predetermined threshold level, and an output indication is given upon the tracking signal attaining a predetermined level relative to the threshold level.

In another aspect, the invention affords a system for monitoring a machining tool to detect wear which comprises a vibration sensor for sensing vibrations produced during the machining of a workpiece with the tool and for generating an electrical vibration signal corresponding to the vibrations. Means are included for processing the vibration signal to produce a tracking signal which tracks the minimum values of the vibration signal. Means are included for comparing the tracking signal to the predetermined threshold level, and indicating means are included for providing an output indication upon the tracking signal attaining a predetermined level relative to the threshold level.

In accordance with more specific aspects, the invention may produce a signal which is related to the total machine tool power. The ratio of this signal to the minimum tracking signal may be formed and the ratio compared to a predetermined threshold level. Changes in machining conditions which result from gradual wear or breakage of the machine tool cause the total energy supplied to the machining and the effective cutting energy to move in opposite directions, thereby causing a large change in the ratio which may be readily detected. In contrast, normal changes in machining conditions which otherwise could cause a change in cutting energy, such as changes in depth of cut, are generally accompanied by a similar change in total energy supplied to the machine tool, which causes little change in the ratio. Thus, use of the ratio as a tool condition monitor has been effective in reducing false alarms.

DESCRIPTION OF THE PREFERRED EMBODIMENT

Figure 1:
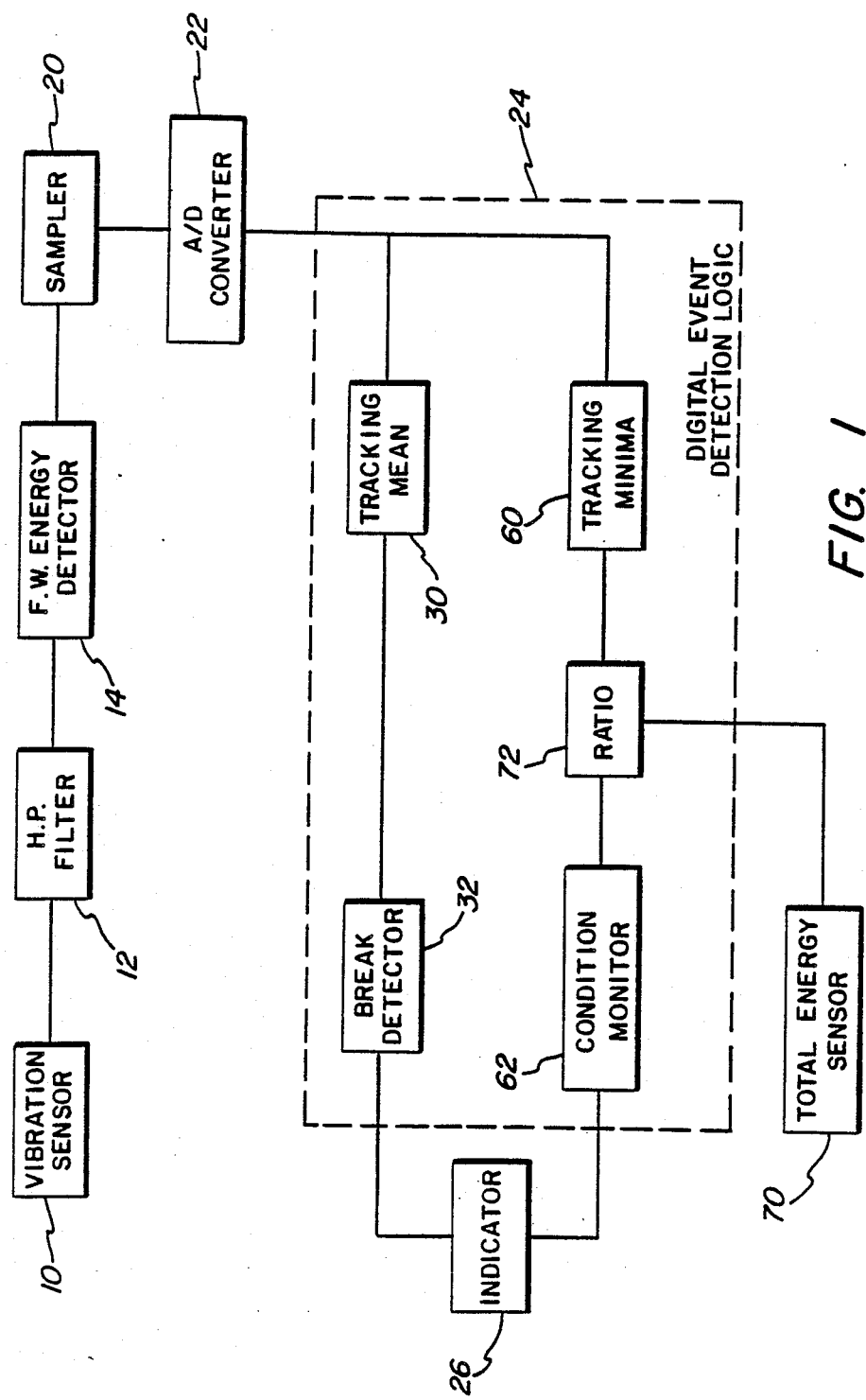
FIG. 1 is a block diagram of a machine tool monitoring system embodying the invention which provides an output indication upon the occurrence of both a sudden tool fracture or break as well as upon gradual deterioration of the tool.

The present invention is particularly well adapted for use in a machine tool monitoring system and process which detects wear and/or breakage of a cutting tool (e.g., cutting insert) of a machine tool such as lathe, milling machine, or the like. The invention is especially suited for detecting gradual deterioration of the tool, and will be described in that context. It will become apparent, however, that this is illustrative of only one utility of the invention. The invention is also applicable to systems and methods which monitor and control a machining process in order to optimize certain parameters of the process, such as cutting efficiency.

As is well known, the cutting edge of a tool or insert of a machine tool such as a lathe or the like is driven by the machine tool to cut a metal workpiece by applying a force at the tool/workpiece interface. In order to cut a given workpiece at a given metal-removal rate, a given amount of power is required. This power, which is supplied by the machine tool, includes both the power necessary to cut the workpiece at the required metal-removal rate, as well as the power to supply losses in the machining process. The losses are generally converted into heat. The ratio of the power or energy required for cutting to the tool power supplied by the machine tool may be termed the efficiency of the cutting process. When the tool is in good condition, cutting efficiency is usually relatively high. However, as the tool condition deteriorates due to breakage, wear, or chip clogging, cutting efficiency deteriorates. The condition of the cutting tool may be monitored by monitoring the cutting efficiency.

There are a number of different parameters that are related to the total power supplied by the machine tool and which can be used readily to indicate changes in the total power. These include spindle horsepower, axis drive current, tool fixture force or strain, and the mean magnitude of low frequency vibrations produced by the machining process. It is more difficult to monitor the portion of the total power that is actually effective for cutting. However, it has been found that the magnitude of the high frequency vibrations produced at the tool/workpiece by the machining process are closely related to the effective cutting energy and are a good indicator of cutting energy. The high frequency vibrations appear to be more sensitive to changes in the geometrical relationships at the tool cutting edge than to the total power supplied to the machine tool, although variations in both geometry and total power affect the high frequency vibrations. There appears to be a unique relationship between changes in the high frequency vibrations and changes in the total energy supplied to the tool. A gradual decrease in the mean value of the high frequency vibration signal, and a corresponding increase in the total energy supplied by the machine tool, have been observed to occur with the normal gradual wear, "crumbly breakage", or chip burning or clogging of cutting tools which occur over a period of time. Accordingly, the high frequency vibration signal has been used as a machine tool monitor.

FIG. 1 is a block diagram of a machine tool monitoring system embodying the invention for detecting both gradual and sudden changes in cutting conditions which accompany gradual wear and breakage, respectively, of a cutting tool. The invention is concerned with detecting gradual wear of the tool, and except for this aspect, as will be described hereinafter, the system of FIG. 1 may be generally similar to the machine tool monitoring systems of commonly assigned U.S. Pat. Nos. 4,642,617 to Thomas et al. and 4,707,688 to Thomas, the disclosures of which are incorporated by reference herein.

As shown in FIG. 1, the system may comprise a vibration sensor 10, such as broadband accelerometer for sensing vibration signals produced at a tool/workpiece interface during a machining process and for converting the vibrations into an electrical signal. The vibration sensor may be mounted directly on the machine tool (not illustrated), preferably at a location which is closely coupled mechanically to the tool/workpiece interface so that the vibrations generated at the interface during a machining operation may be readily sensed. Sensor 10 may be located, for example, on the turret of a lathe, as described in the afore-referenced patents. The signals from sensor 10 may be filtered by a high pass filter 12 which eliminates machinery noise and other low frequency signals below approximately 30 KHz, for example, and the filtered signals may be supplied to a full wave energy detector 14 comprising, for example, a full wave rectifier and a low pass filter having a cutoff frequency of the order of 500 Hz or less. The output of the full wave energy detector is a unipolar analog signal corresponding to the high frequency vibration energy produced during the machining process.

Figure 2:
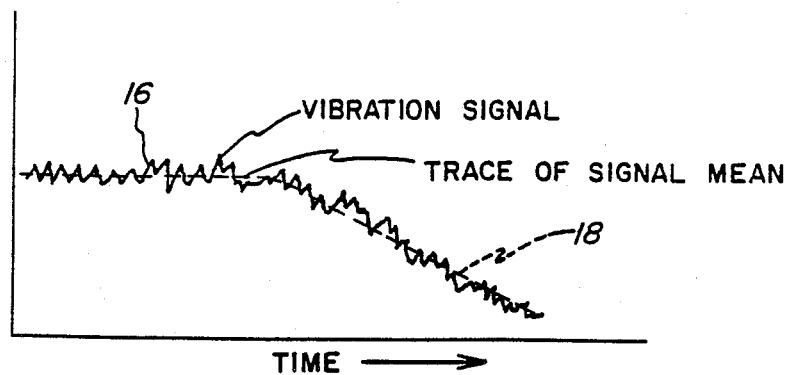
FIG. 2 illustrates a unipolar high frequency analog vibration signal which may be produced by the system of FIG. 1, the figure showing a gradual decrease in mean signal level with time as is characteristic of a decrease in cutting efficiency.

FIG. 2 illustrates a unipolar high frequency vibration signal 16 such as may be produced by the full wave energy detector 14. As shown in FIG. 1, the unipolar signal from the full wave energy detector may be sampled by a sampler 20, and the samples may be converted to digital form by an analog-to-digital converter 22. The digital samples may then be supplied to digital event detection logic 24 where the samples are subjected to processes which monitor the cutting conditions and detect changes in cutting efficiency occasioned by tool wear or breakage, as will be described shortly. The output of the digital event detection logic 24 may be supplied to an indicator 26, such as a tool break alarm or the like, which provides an output indication upon the cutting tool condition deteriorating a given amount.

In order to monitor the condition of the tool, the digital event detection logic 24 may include a tracking mean circuit 30 which computes a new mean value of the last N signal samples during each signal sample period, and a break detector circuit 32 for detecting sudden tool fracture events and for providing an appropriate output to indicator 26. Break detector 32 may comprise, for example, a circuit for detecting the signal mean falling below one or more predetermined threshold values and remaining below such values for a predetermined period of time (in order to eliminate false alarms due to noise), as disclosed, for example, in the afore-referenced U.S. Pat. No. 4,707,688.

Up to this point just described, the system of FIG. 1 may be generally similar to the machine tool monitoring systems disclosed in the afore-referenced patents. The tracking mean circuit 30 and break detector 32 may be similar to and perform the functions of the transient detector and the circuit which tests for persistent shift of mean as disclosed in those patents. They are intended to detect sudden or abrupt changes in mean level of the high frequency vibration signal which are indicative of sudden tool breakage. The invention is concerned with detecting gradual changes in the tool due to wear or "crumbly breakage", and it employs a different type of circuit and process for detecting gradual tool wear from those disclosed in the referenced patents. The circuit and process of the invention are more sensitive to a decrease in cutting efficiency and are more reliable than previously used circuits and methods for detecting gradual tool wear. In the past, the tracking mean value signal of the high frequency vibration signal has been used to monitor cutting tool deterioration due to gradual wear, as shown in the referenced patents. In contrast, the present invention monitors gradual tool wear by tracking the minimum value of the high frequency vibration signal, as will now be described.

Figure 3:
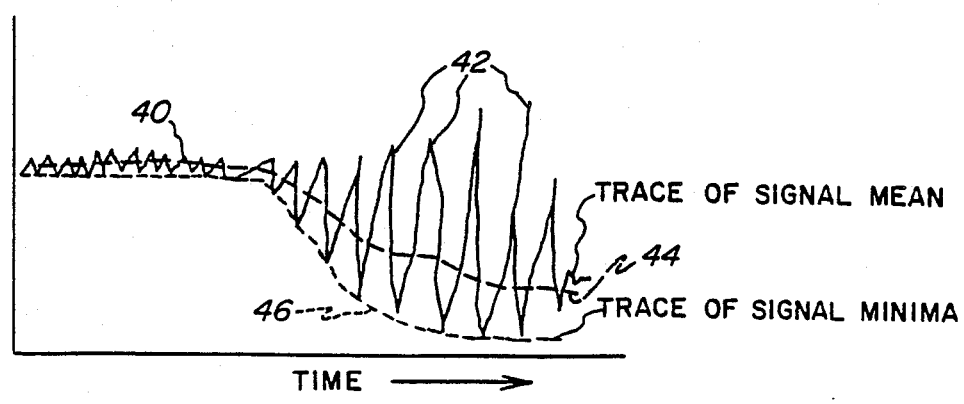
FIG. 3 illustrates another unipolar high frequency vibration signal which is typical or signals which have been observed in monitoring machining operations where the gradually decreasing mean value of the signal is obscured by noise spikes.

As pointed out above, there is a relationship between cutting edge geometry and cutting efficiency which is reflected in the high frequency vibration signal. As the cutting edge of the tool deforms and the rake angle changes, as where the cutting changes from a chisel-type operation to more of a scraping action, there is often a marked increase in the occurrence of high amplitude noise spikes in the high frequency vibration signal which results from the abnormal cutting conditions. These noise spikes counteract and obscure the decrease in mean signal level due to cutting edge deterioration. They enter into the computation of the mean level of the vibration signal, and increase the mean above what it would be in the absence of the noise. This may be seen by a comparison of the unipolar vibrational signals of FIGS. 2 and 3. In FIG. 2, the vibration signal and its mean 18 decrease gradually without much change in peak-to-mean ratio of the signal due to noise. In contrast, the vibration signal 40 shown in FIG. 3, which is more typical of high frequency vibration signals which have been observed while monitoring machining operations where cutting efficiency was decreasing, is characterized by large increases in both the density and the peak-to-mean ratio of noise spikes 42 which accompany the decrease in mean signal level. The decrease in mean value of the signal is considerably less than is the decrease in the signal minima 46, as shown in FIG. 3. This indicates that better sensitivity in detecting the cutting energy decrease associated with gradual wear or breakage may be obtained by tracking the signal minima level rather than the signal mean level. This is done by the invention.

Figure 4:
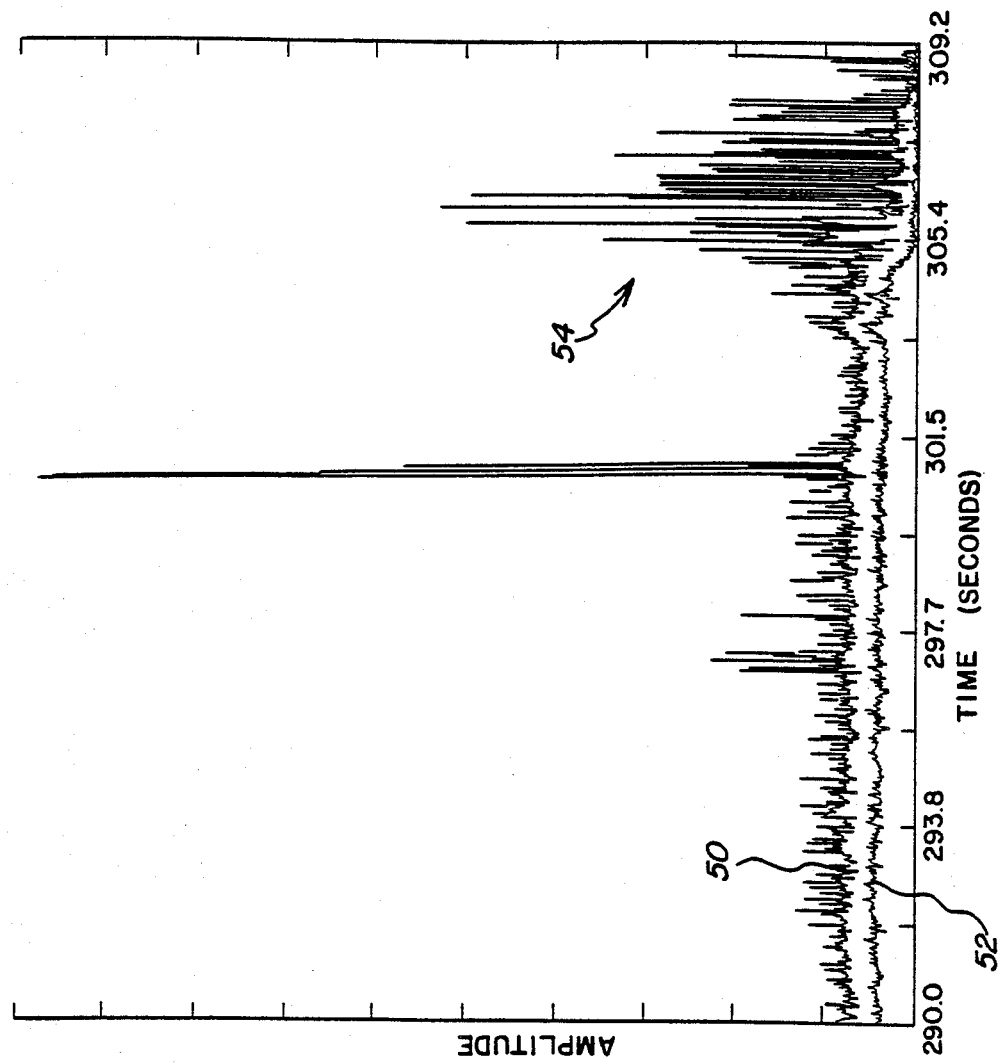
FIG. 4 is a plot of the actual maxima and minima traces of a high frequency vibration signal in a tracking thirty-two samples block of signal samples from a chip burn/tool clog incident on a milling machine.

The efficacy of using a tracking minima of the high frequency vibration signal rather than the tracking mean is clearly illustrated in FIG. 4. FIG. 4 is a plot of the actual traces of a high frequency vibration signal maxima (trace 50) and minima (trace 52) in each of a plurality of 32-sample blocks of a total of 38,400 samples obtained from a chip burn/tool clog incident on a milling machine. FIG. 4 illustrates 19.2 seconds of real-time (between 290.0 and 309.2 seconds) of the machining process. The high frequency vibration signal was sampled at 2000 samples per second for the 19.2 seconds of real-time shown in the figure. The samples in each successive block were stored in digital memory and then processed using conventional signal processing software to detect the minimum and maximum samples in each 32-sample block. The traces 50 and 52 illustrated in FIG. 4 comprise, respectively, the highest and lowest amplitude signal levels in each 32-sample block of the total number of samples. The mean signal trace is not shown in FIG. 4.

As is clearly shown in FIG. 4, the minima trace 52 falls off rapidly after approximately 303.6 seconds, and quickly decays to less than ten percent of its value prior to that time. The maxima trace 50 also begins to decay at about the same time. However, the large noise spikes 54 obscure the decreasing trend in the maxima trace and, as may be appreciated, would clearly prevent the mean signal from decaying as rapidly and as consistently as the minima trace 52. Although the actual decrease of the mean trace would depend upon other factors, such as the degree of clipping before using a signal sample for a new mean computation, and the number of signal samples averaged to compute each mean signal sample, FIG. 4 clearly illustrates that regardless of these factors noise makes the signal mean a far less sensitive indicator of tool condition than the signal minima trace.

Returning to FIG. 1, the digital samples from A/D converter 22 to the digital event detection logic 24 may be supplied to a tracking minima circuit 60 and subsequently to a condition monitor circuit 52 which detects a decrease in the minima trace below a predetermined threshold and provides an appropriate output to indicator 26. A threshold may be established for condition monitor 62 as, for example, by monitoring the level of the tracking minima during a period of time at the beginning of the machining process, and selecting some fraction of this level, such as one-half, as a threshold level.

In a preferred form, the digital event detection logic 24 comprises a microcomputer in which the previously described and illustrated functions within this logic block are implemented in software. Alternatively, the described elements and functions may be implemented using standard integrated circuit combinatorial and sequential logic elements, if desired.

Although decreases in cutting efficiency associated with tool breakage and wear are accompanied by decreases in the unipolar high frequency vibration signal, decreases in the vibrational signal may be caused by certain conditions that are encountered during normal machining. As pointed out above, the magnitude of the high frequency vibration signal is influenced not only by the cutting energy but also by the total machine tool power. Changes in total machine tool power occasioned by changes in depth of cut, for example, are hard to separate from tool condition effects. However, the ratio of a signal indicative of the total machine tool power to the high frequency vibration signal magnitude is useful as a tool condition monitor. Changes in normal machining conditions, such as depth of cut, tend to change both the total machine tool power and the high frequency vibration signal magnitude (which represents cutting energy) in the same direction, i.e., both the numerator and denominator signal levels in the ratio change in the same direction. This has little resultant effect on the ratio. Changes in tool condition which cause a decrease in cutting energy and efficiency, however, tend to increase the total power (numerator) signal level while decreasing the high frequency vibration (denominator) signal level. This causes the ratio to increase.

The invention may employ the ratio of a signal indicative of total machine tool power, such as spindle horsepower or the signal level of a low frequency band of the vibration signal, to the high frequency band of the vibration signal magnitude as a tool condition monitor. FIG. 1 illustrates one way in which this may be accomplished. As shown, the system may include a total energy sensor 70 which produces an output signal that corresponds to the total power supplied by the machine tool, such as spindle horsepower or low frequency signal level, and a ratio circuit 72 which forms the ratio of he total machine tool power signal from sensor 70 to the magnitude of the tracking minima from circuit 60. This ratio rather than the tracking minima may be employed by condition monitor 62 to monitor tool condition. This allows the false alarm rate to be reduced.

Figure 5:
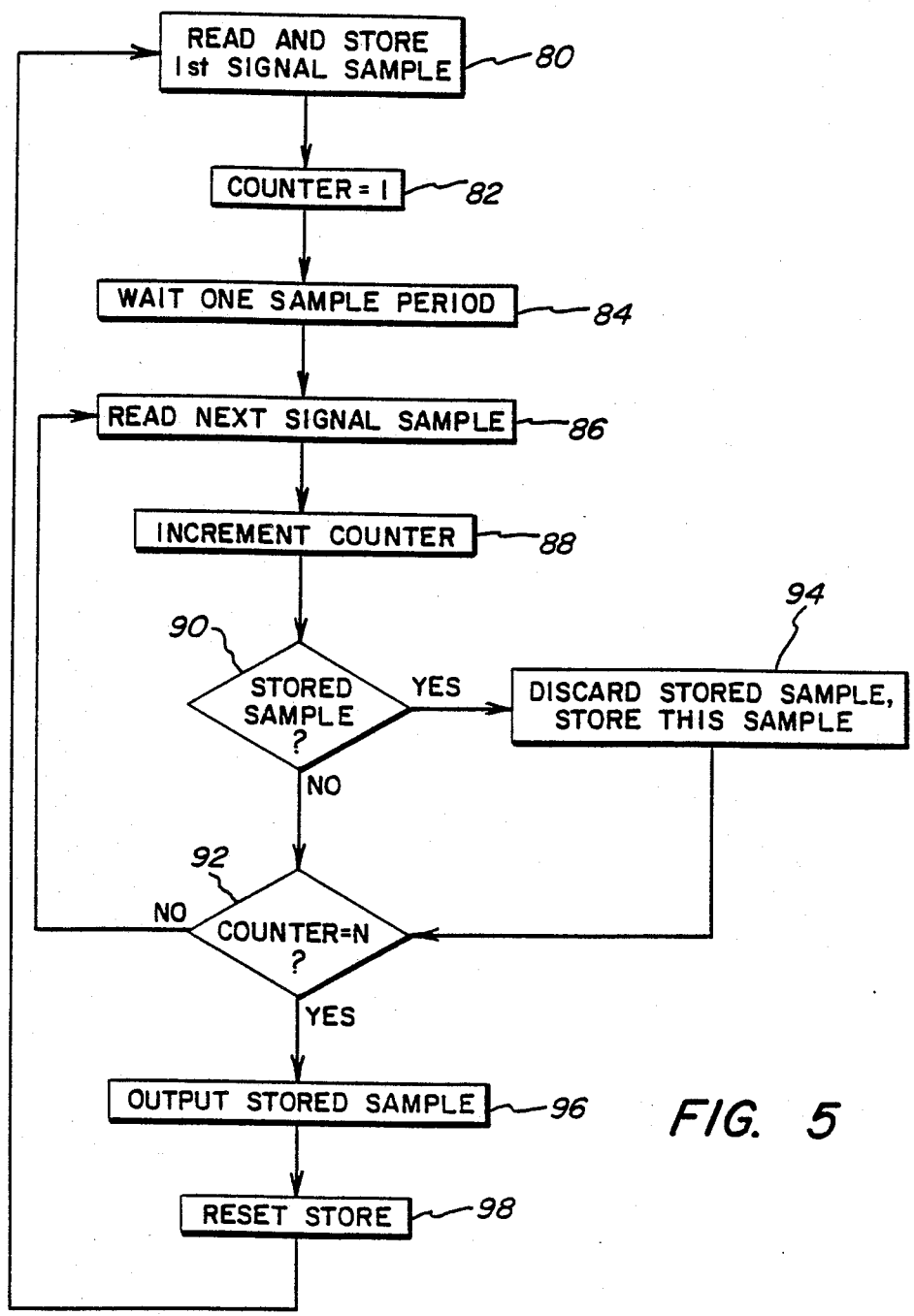
FIG. 5 is a flow chart illustrating a process which may be employed by the invention for detecting signal minima.

FIG. 5 illustrates a flow diagram of a process which may be conveniently implemented on a microcomputer and used to produce the tracking minima trace of the high frequency vibration signal. Since the tracking minima is not employed to detect sudden tool fractures, but only tool condition changes that develop over a period of seconds or more, the minimum signal sample trace does not have to be computed each period of the analog signal sampling function, (i.e., each 500 microseconds for a 2 KHz sampling rate). It is sufficient, instead, to compute the minimum of the last N sampling rate and N=8, for example, the minimum amplitude of the last eight signal samples would have to be computed only every four milliseconds. This is reflected in the process illustrated in FIG. 5.

Referring to the figure, the first analog signal sample may be obtained and its amplitude stored in a memory, as indicated at 80, and a sample counter set to 1, as indicated at 82. After one sample period (84) another signal sample may be read (86), the counter incremented (88), and the new sample value compared, as shown at 90, with the stored sample. If the new sample value is higher than the stored sample value, the counter value is compared with N, as shown at 92, where N is the number of signal samples to be used in selecting the minimum value. If the counter is less than N, the process loops back to block 86 where the next signal sample is read, the counter is again incremented, and the new sample value is compared with the storage sample value. This cycle repeats until one of the two tests at blocks 90 and 92 yields a YES answer.

If, at 90, the new sample value is found to be less than the stored sample, the old stored sample is discarded, as indicated at 94, and is replaced with the new lower amplitude sample. If the counter value is found to be equal to N, as indicated at 92, the sample value currently stored is output as the sample minimum trace value for the last N analog signal samples, as indicated at 96. The stored value is then reset to zero, as indicated at 98, and the process is repeated with a new first signal sample for the next window of N analog signal samples While a preferred embodiment of the invention has been shown and described, it will be appreciated by those skilled in the art that changes may be made in this embodiment without departing from the principles and spirit of the invention, the scope of which is defined in the appended claims.

What is claimed is:

1. A method of detecting machining tool wear comprising the steps of sensing vibration energy produced upon machining a workpiece with said tool; generating an electrical vibration signal corresponding to the sensed vibration energy; processing the vibration signal to produce a tracking minimum signal which tracks the minimum values of the vibration signal; comparing the tracking signal to a predetermined threshold level; and indicating in response to the comparing, the tracking signal attaining a predetermined level relative to the predetermined threshold level.

2. The method of claim 1, wherein said steps of sensing and generating comprise sensing energy in a predetermined frequency band and forming a unipolar signal representative of the energy; and said processing step comprises converting the unipolar signal to a digital signal; collecting samples of the digital signal over a predetermined period of time; comparing the samples to detect the sample having the smallest value; storing the sample having the smallest value; and repeating the process to form the tracking minimum signal from the stored samples.

3. The method of claim 2, wherein said predetermined frequency band comprises frequencies greater than approximately 30 KHz.

4. The method of claim 2, wherein said predetermined period of time comprises a plurality of signal sample periods.

5. The method of claim 1, wherein said comparing step comprises establishing a reference value for the amplitude of the tracking signal during a portion of the machining, and setting said predetermined threshold level at a predetermined fraction of such amplitude.

6. The method of claim 1, wherein said comparing step comprises monitoring the tracking signal level to detect a gradual decrease in such level over a period of time.

7. The method of claim 1, wherein said sensing step comprises sensing a parameter related to total machine tool energy and producing another signal corresponding thereto; and said comparing step comprises forming a ratio of said other signal to the tracking minimum signal, and comparing said ratio to the predetermined threshold level.

8. The method of claim 7, wherein said step of sensing total machine tool energy comprises sensing a parameter of the machining tool which is related to the load on the machine tool.

9. The method of claim 8, wherein said step of sensing total machine tool energy comprises sensing input power to the machine tool.

10. The method of claim 7, wherein said parameter related to total machine tool energy comprises low frequency vibration energy produced during said machining.

11. The method of claim 1 further comprising producing another tracking signal which tracks a mean value of the vibration signal, and monitoring the level of said mean value tracking signal to detect sudden tool breakage.

12. A method of detecting gradual wear or breakage of a machine tool comprising the steps of measuring a parameter representative of total input power to the machine tool and producing a corresponding first signal; sensing vibrations produced during machining of a workpiece from a tool/workpiece interface and producing a corresponding second vibration signal; processing the second vibration signal to produce a tracking minimum signal which tracks the minimum value of the vibration signal; forming a ratio of the first signal to the tracking minimum signal; and providing an output indication upon the ratio exceeding a predetermined threshold level.

13. A system for monitoring a machine tool to detect wear comprising a vibration sensor for sensing vibrations produced during machining of a workpiece with said tool and for generating an electrical vibration signal corresponding to the vibrations; means for processing the vibration signal to produce a tracking minimum signal which tracks the minimum values of the vibration signal; means for comparing the tracking signal to a predetermined threshold level; and means for indicating, in response to the comparing means, the tracking signal attaining a predetermined level relative to the threshold level.

14. The system of claim 13, wherein said vibration sensor generates an electrical signal corresponding to vibrations covering a broad frequency band, and said processing means comprises means for producing a unipolar signal corresponding to vibration energy above a predetermined frequency; means for sampling the unipolar signal and for converting the sample values to digital values; means for processing a plurality of digital values produced over a corresponding plurality of sample periods to detect a minimum digital value, means for storing the minimum digital value, and means for forming said tracking minimum signal from a plurality of stored minimum digital values.

15. The system of claim 13 further comprising means for monitoring said tracking minimum signal during a portion of the machining, and means for setting the predetermined threshold level at a fraction of the amplitude of the tracking minimum signal during said machining portion.

16. The system of claim 13, wherein said comparing means comprises means for detecting a gradual change in the level of the tracking minimum signal which occurs over a predetermined period of time.

17. The system of claim 13 further comprising means for producing another signal corresponding to total machine tool energy; means for forming a ratio of said other signal to the tracking minimum signal; and means for comparing said ratio to the predetermined threshold.

18. The system of claim 17, wherein said means for producing said other signal comprises means for sensing input power to the machine tool.

19. The system of claim 13, wherein said producing means further comprises means for producing a tracking mean signal which tracks the mean level of the vibration signal; and means for comparing the tracking mean signal to another predetermined threshold level to detect sudden tool breakage.

* * * * *